United States
Hooper

3,636,359
Jan. 18, 1972

[54] OPTICAL NONMECHANICAL FEEDBACK CONTROL OF ELLIPTICITY MODULATORS

[72] Inventor: Paige B. Hooper, Glendora, Calif.
[73] Assignee: Cary Instruments, Monrovia, Calif.
[22] Filed: Apr. 13, 1967
[21] Appl. No.: 630,591

[52] U.S. Cl..............................250/217, 250/225, 350/149, 356/116, 356/117
[51] Int. Cl.............................G01j, H01j 39/12, G02f 1/26
[58] Field of Search..................350/150, 149, 151; 356/117, 356/116; 250/200, 216, 225, 217, 199

[56] References Cited

UNITED STATES PATENTS

| | | | |
|---|---|---|---|
| 3,556,663 | 1/1971 | Cary | 356/116 |
| 2,064,289 | 12/1936 | Cady | 350/149 X |
| 3,495,912 | 2/1970 | Hooper et al. | 350/151 X |
| 3,450,478 | 6/1969 | Sebestyen | 356/117 |

FOREIGN PATENTS OR APPLICATIONS

| 1,226,328 | 10/1966 | Germany | 356/117 |

Primary Examiner—James W. Lawrence
Assistant Examiner—T. N. Grigsby
Attorney—White & Haefliger

[57] ABSTRACT

The invention concerns simplified automatic control of the peak birefringence of a modulator which is operable upon a linearly polarized beam of radiation to derive a modified beam having cyclically varying elliptical polarization. Simplified automatic compensation of the electrical drive signal applied to the modulator drive transducer functions solely in response to variations in the character of a beam of radiation that has passed through the modulator.

4 Claims, 4 Drawing Figures

PATENTED JAN 18 1972

3,636,359

INVENTOR.
PAIGE B. HOOPER
BY
*White & Haefliger*
ATTORNEYS.

OPTICAL NONMECHANICAL FEEDBACK CONTROL OF ELLIPTICITY MODULATORS

This invention relates generally to instrumentation for use in making measurements with polarized light. More specifically, it concerns improvements in controlling the magnitude of cyclical birefringence in birefringence modulators.

For present purposes, a birefringence modulator is a cyclically driven device operable upon a linearly polarized beam of radiation to derive a modified beam or beams having cyclically varying elliptical polarization. Such a beam may be utilized for passage through a sample characterized as circularly dichroic, whereby differential absorbance by the sample of left and right circularly polarized light, i.e., circular dichroism, may then be detected and measured. Such a beam also has utility in other types of measuring instruments, such as those for determination of optical rotation produced by specimens. Known birefringence modulators for producing such beams include strain birefringence modulators and electro-optic modulators, among others; for the sake of simplicity, however, the present invention will only be described as applied to a strain birefringence modulator of advantageous construction and mode of operation as disclosed in the copending application of Hooper et al., for U.S. Letters Patent, entitled, "Strain Birefringence Modulator and Application," Ser. No. 595,194 now U.S. Pat. No. 3,495,912. Also for the sake of simplicity, the invention will only be described as applied to such a modulator for use in a system designed to measure circular dichroism. However, the control system herein described is equally useful in connection with modulators of other types, and in systems for measuring other polarization phenomena.

In order that the ellipticity of polarization of the beam emerging from the modulator may assume optimal values for the purposes of a circular dichroism measurement, the cyclically varying birefringence of the modulator must assume a corresponding optimal amplitude. When the ellipticity of the emerging beam varies sinusoidally with time, optimum circular dichroism measurement accuracy is achieved when the peak retardation is about 113°. For this purpose, vibration of a cyclically strained modulator must be controlled to maintain such a desired peak birefringence, even though the wavelength of radiation supplied to the modulator is varied. The amplitude of strain variation required in such modulator to produce optimum ellipticity of the emerging beam varies with wavelength. It is a major object of the present invention to provide for simplified automatic control of the peak birefringence, requiring no wavelength programming. The invention enables simplified automatic compensation of the electrical signal applied to the modulator drive transducer, solely in response to variations in the character of a beam of radiation that has passed through the modulator.

Basically, the instrumentation comprises first means, operable upon a beam emerging from the modulator with cyclically varying ellipticity, to derive a modified beam whose intensity also varies cyclically, as a function of the ellipticity of the emergent beam; and second means, responsive only to such intensity variation, for cyclically stressing the modulator. The relationship between the retardation introduced in the beam emergent from the modulator and the resulting intensity of the modified beam is made such that the system tends toward a stable equilibrium oscillation condition, at which the peak retardation is optimal for use in an associated system for the measurement of circular dichroism. More specifically, a component of the modified beam intensity diminishes as the peak retardation introduced by the modulator increases, near a critical value. As will be seen, the system eliminates need for any electrical pickup on the modulator to provide feedback coupling for driving the modulator, as well as other circuitry, since the modulator is driven only in response to variations in the modified beam intensity.

The above-mentioned first means typically includes a plane mirror disposed to return an elliptically polarized beam from the modulator for a second pass through the modulator, and a fixed-retardance retarder and an analyzer for further processing the reflected beam to produce the above-mentioned modified beam, as will be explained in detail hereinafter.

The above-mentioned second means typically includes a phototube receiving the modified beam, and producing an output varying in correspondence to intensity variations of the modified beam, an amplifier responsive to a component of the output of the phototube, and an electromechanical transducer responsive to the output of the amplifier, mechanically to drive the modulator. No circuitry other than such phototube, amplifier, and a transducer, plus appropriate power supplies and interconnections is needed to establish equilibrium oscillation amplitude of the modulator.

The above improvements are of unusually advantageous use in a system that includes a linear polarizer to receive unpolarized monochromatic light and to produce linearly polarized ordinary and extraordinary beams incident upon the modulator, the modified beam being derived from one of the ordinary or extraordinary beams, the other of the beams passing through the modulator and emerging with cyclically varying elliptical polarization for passage through a sample characterized as circularly dichroic, together with means to detect and measure differential absorbance by the sample of left and right circularly polarized light characteristic of the elliptically polarized beam.

Alternatively, the modified beam may be derived from the same beam used for passage through the sample, by means of any conventional beam splitting device such as, for example, a pellicle mirror.

These and other objects and advantages of the invention, as well as the details of illustrative embodiments, will be more fully understood from the following detailed description of the drawing, in which.

Figure 1:
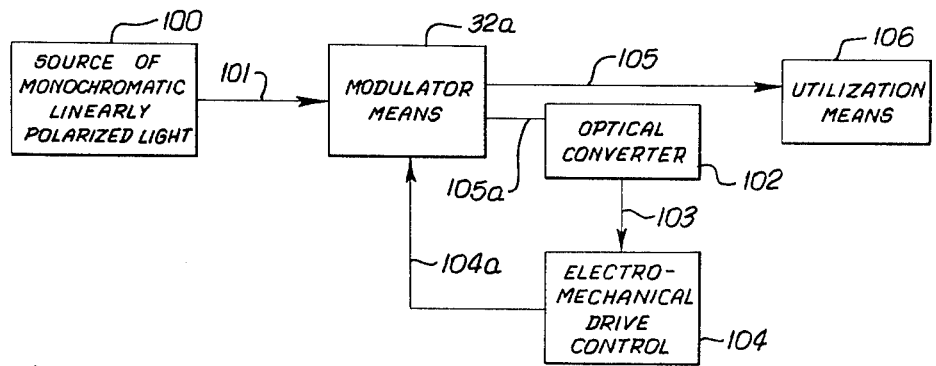
FIG. 1 is a block diagram of the system of the invention.

FIG. 1 shows a source 100 of approximately monochromatic linearly polarized light, whose wavelength may be varied. Operating upon a beam or beams 101 of such light is a birefringence modulator means 32a which derives a beam 105 having cyclically varying elliptical polarization. Beam 105 is directed to utilization means 106, which may for example comprise a specimen, a photodetector, and associated electronic circuitry for the measurement of circular dichroism. Modulator means 32a also derives from beam 101 another beam 105a, also having cyclically varying elliptical polarization. As will be explained in detail hereinafter, in a preferred embodiment the polarization condition of beam 105a is not the same as that of 105, the difference resulting from the fact that modulator 32a operates only once upon beam 101 to produce beam 105, but operates twice in sequence upon beam 101 to produce beam 105a.

Beam 105a is directed to optical converter 102 which derives a modified beam 103 whose intensity varies cyclically as a function of the ellipticity of beam 105a, and thus of beam 105. Beam 103 is directed to electromechanical drive control means 104, responsive only to the intensity and time phase of beam 103, for controlling modulator 32a. In the case discussed here, modulator means 32a is of the strain birefringence type, and drive control means 104 produces an electrical control signal in feedback path 104a, for controlling cyclical stressing of the modulator, to produce cyclical strain and thus cyclical birefringence therein. Optical converter 102 is such that a component of the modified beam intensity 103, preferably that component whose frequency is the modulator operating frequency, diminishes as the amplitude of oscillation of the differential retardation of beams 105 and 105a increases, near a specified level. As a consequence the loop comprising modulator means 32a, converter 102 and control 104 tends toward oscillation with a characteristic equilibrium amplitude.

Figure 2:
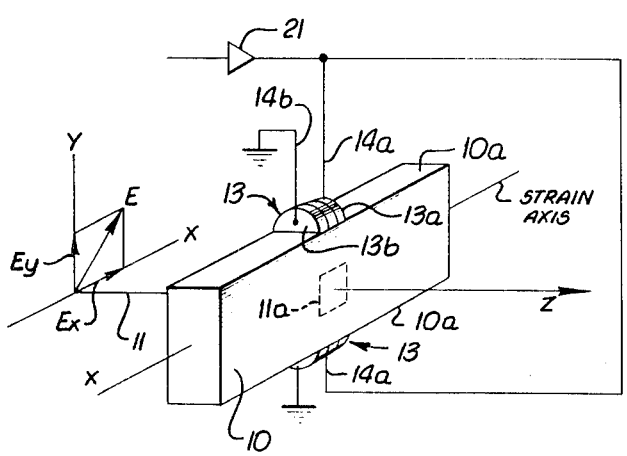
FIG. 2 is a perspective showing of one form of modulator usable in the FIG. 1 system.

Referring next to FIG. 2, the modulator illustrated may be used in the FIG. 1 system, and comprises a body, as for example plate 10, adapted to pass electromagnetic radiation directed thereto along a predetermined path, say path 11 along the Z axis. The body or plate is characterized as becoming optically plane birefringent, under the influence of applied stress. Thus, light which enters the material of the body linearly polarized emerges therefrom elliptically polarized. FIG. 2 shows the electric vector E of linearly polarized light incident upon the plate, the vector having component $E_x$ lying in the direction of the strain axis X of the plate 10, and component $E_y$ extending normal to component $E_x$. Also, E extends at a 45° angle to each of the axes X and Y. Under these conditions the phase difference between the $E_x$ and $E_y$ component waves emergent from the plate can be made to vary cyclically by generating within the plate a cyclically varying birefringence, so that the degree of elliptical polarization of emergent light will vary between plus and minus values. The 45° orientation constitutes a special case in which the plane-birefringent plate only produces ellipticity and does not introduce rotation. The transparent plate, which may typically consist of fused silica or "Suprasil," is made appropriately cyclically birefringent by cyclically stressing the plate along its X or strain axis, indicated in FIG. 2.

FIG. 2 shows drive structure connected in mechanical oscillation transmitting relation to the plate to effect plate vibration along the X or strain axis, as described in the above-mentioned Hooper et al. application. The transducer form of drive structure in FIG. 2 includes suitable piezoelectric elements 13 attached to the plate's opposite edges 10a at center nodal points, i.e., half way along the X-axis dimension of the plate. Merely by way of example, the drivers may consist of barium titanate, being about 0.125 inch thick, 0.200 inch wide i.e., the same as the plate thickness) and about 0.250 inch long. They may be cut from commercial grade piezoelectric material known as "PZT-4," a product of the Clevite Corporation.

The drivers have opposed conductive coatings 13a and 13b to which electrical connections are made at 14a and 14b to transmit the actuating signal to the devices, thereby to cause the plate to vibrate resonantly along the X-axis or plate length (strain) dimension. With a sinusoidal drive signal input, the sinusoidal strain which the plate undergoes makes the plate become plane birefringent, with the magnitude and sign of the birefringence varying sinusoidally in time. If the plate dimensions are fairly large in relation to the optical beam cross section dimensions, the strain and hence birefringence are quite homogeneous over the small cross section 11a intersected by the beam path 11.

As will appear, electrical oscillations are transmitted at 14a from amplifier-oscillator 21 to the drivers so as to maintain the peak retardation (in wavelengths) introduced by the modulator plate substantially constant, at a predetermined value related to other operating parameters, as explained more fully hereinafter, the plate preferably vibrating longitudinally at its fundamental resonant frequency. Accordingly, the peak retardation at cross section 11a remains constant.

Figure 3:
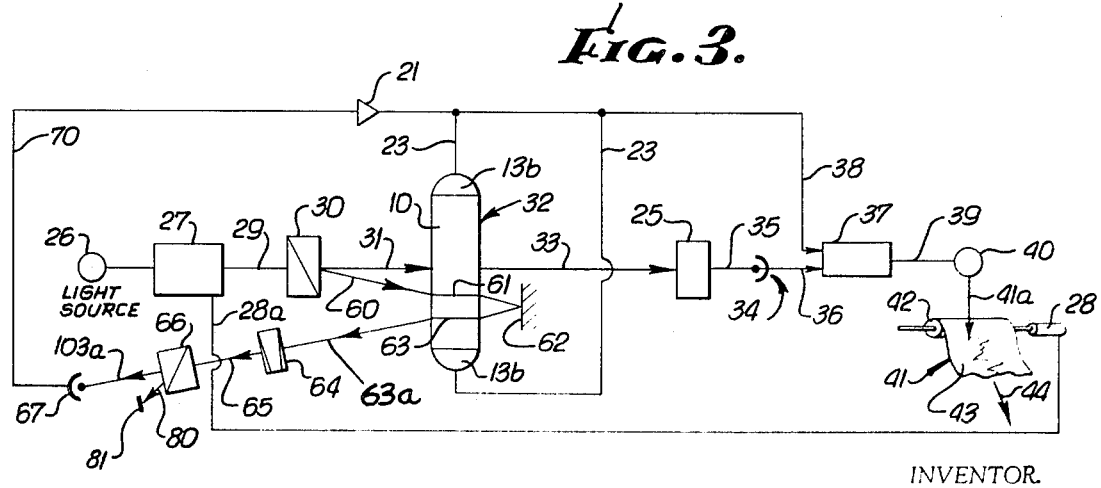
FIG. 3 is a more detailed showing of a system wherein the invention is of unusually advantageous use, and as applied to the measurement of circular dichroism of a test sample.

FIG. 3 illustrates the use of the FIG. 2 plate in a system for measuring circular dichroism of a sample 25. The element 26 designated "light source" emits electromagnetic radiation as a continuum over a relatively broad range of wavelengths, which may be in the visible, infrared and/or ultraviolet portions of the electromagnetic spectrum. The term "light" will be used to designate any of such radiation. The monochromator 27 has the function of selecting from this continuum a narrow band of wavelengths for use in measuring the circular dichroism of the sample, as is known. Depending upon the application, the monochromator may be a relatively coarse apparatus, or a fine high-resolution device such as that employed in Model 60 Automatic Recording Spectropolarimeter produced by CARY Instruments, Monrovia, California. A scan drive 28 may be coupled at 28a to the monochromator to cause it sequentially to select different narrow wavelength bands of light for transmission at 29, the arrangement being such that the nominal or central wavelengths of the selected bands form the locus of a smoothly varying function of time—a monotonic function—of approximately constant slope.

From the beam 29 leaving the monochromator, a substantially linearly polarized component is selected by the polarizer element 30 and transmitted at 31, as the ordinary beam. See in this regard the Model 60 apparatus above identified, as well as the article "Circular Dichroism Theory and Instrumentation," by Abu-Shumays and Duffield, Analytical Chemistry, Vol. 38, June 1966. The extraordinary beam 60 is utilized in a manner which will be described.

Linearly polarized light at 31 is incident upon the vibrating modulator 32, of the construction seen in FIG. 2, so that light leaving the modulator at 33 is in general elliptically polarized, i.e., having electric and magnetic vectors each of whose tips describes an ellipse, in time, when projected into a plane perpendicular to the direction "Z" of light propagation. Such light may be considered equivalent to two counterrotating circularly polarized components vectorially added, the relative magnitudes of the two components determining the magnitude of the ellipticity. The algebraic sign of the ellipticity is determined by the direction of rotation of the resultant vector, i.e., by the "sense" of the larger circularly polarized component.

Light leaving the modulator at 33 is incident upon the sample 25, which absorbs unequally the circularly polarized components of opposite "sense," so that, as the ellipticity periodically changes sign, the total amount of light incident on the phototube undergoes a corresponding periodic variation, i.e., larger when the light passing through the sample possess a net circularly polarized component of the sense absorbed to lesser degree by the sample, and smaller when the net circularly polarized component is of the sense absorbed to greater degree by the sample.

A phototube 34 receives both fluctuating and steady (or constant) components of light flux transmitted from the sample at 35 so that the current output of the tube contains both fluctuating and DC components. The fluctuating components are substantially sinusoidal AC, one component of frequency equal to the fundamental frequency of the modulator plate, and other components having frequencies which are odd multiples of the fundamental, and corresponding in magnitude to the difference between the transmission levels for the circularly polarized components of opposite sense. There may also be small relatively insignificant AC current components due to parasitic vibration of the plate 10, at frequencies other than the plate fundamental frequency. The DC component corresponds in magnitude to the average or mean transmission of the sample for light in general.

The phototube output at 36 is fed to readout electronic circuitry 37, which may be comparable to that described in U.S. Pat. No. 3,257,894 to Grosjean, with the exception that the carrier frequency is the fundamental vibratory frequency of the modulator plate 10. A synchronizing input signal to circuitry 37 is shown as derived at 38 from the amplifier 21 whose output at 23 controls the piezoelectric drivers 13, for use in a detector embodied in block 37 to derive a detected version $I_1$, of the AC output component from tube 34. The readout circuitry also derives the ratio of $I_1$ to $I_2$, the latter being a version of the DC output component from tube 34. The value of the ratio is very nearly proportional to the actual value of circular dichroism of the sample.

To expedite the electronic determination of the ratio $I_1$ to $I_2$ in the best embodiment now known for determination of circular dichroism of absorbing samples, or over a wide range of wavelengths, it is desirable to provide an automatic gain-control feature which maintains approximately constant the DC component of the phototube output, at a point in the system ahead of that at which the ratio determination is performed.

Such a gain-control feature maintains the signal levels in the ratioing device within suitable operating limits. In one such suitable system the automatic gain-control is in the form of an automatic regulator for the dynode voltage, and maintains the DC current $I_2$ constant to within 1 percent of a nominal value. (In such a system, the absolute value of the AC component $I_1$ is itself a measure of the circular dichroism, within the accuracy of the regulating system, i.e., 1 percent.)

An output signal at 39 from the readout 37, and proportional to $I_1/I_2$, is fed to the actuator 40 controlling the position of an ink pen 41a of a strip chart recorder 41, thereby to record a value which is an excellent approximation to the circular dichroism of the sample. The scan drive motor 28 referred to above also drives a platen 42 translating the chart paper 43 in a direction 44 normal to the motion of the recording pen, so that the position of the pen longitudinally along the chart paper is a continuous known function of wavelength. Thus an ink tracing of circular dichroism versus wavelength is produced.

As mentioned in the introduction, the invention has as one important purpose the provision of a simplified automatic control of peak retardation at the modulator, thereby eliminating need for a pickup at the modulator or for independent and objectionably inaccurate programming to compensate the modulator for changes in wavelength of the monochromatic light transmitted at 29 and 31. In this regard, use is made of the extraordinary ray 60 which like the ordinary ray 31 is linearly polarized, and corresponds to part of beam 101 in FIG. 1. The usage is such that a modified beam 103a (corresponding to beam 103 of FIG. 1) is derived and characterized in that its intensity varies cyclically as a function of the cyclical strain amplitude in plate 10.

The first means as represented by block 102 in FIG. 1 may for example include a device such as a reflector 62 positioned to receive the beam 60 after it has passed through the vibrating plate 10 at 61, and to return the beam at 63 back through the plate, thereby doubling the phase retardation. By disposing the mirror 62 for substantially normal incidence of the beam 61, the retardation effects introduced on reflection at the mirror surface may be maintained at a negligible level. The emergent beam 63a is then passed through a fixed retarder 64, as for example a fixed nominal quarter-wave retarder characterized in that incident linearly polarized light (properly oriented) emerges from the retarder circularly polarized. Retarder 64 advantageously has its "fast" and "slow" axes oriented one parallel and one perpendicular to the strain axis X of plate 10. The emerging beam 65 then passes through an analyzer 66 which transmits only the component of incident light polarized parallel to the transmission axis of the analyzer. The modified beam 103a emerges from the analyzer, for intensity detection by means including a photomultiplier 67.

Figure 4:
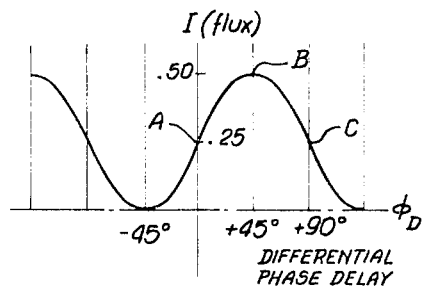
FIG. 4 is a graph of modified beam intensity as a function of differential phase delay between the two vector components of the beam passed through the modulator.

In order better to understand the relationship between the resultant intensity of beam 103a and the operation of the plate 10 to cyclically modify the differential phase retardation between components of the electric vector characterizing the linearly polarized extraordinary beam 60, consider the following three cases, and refer to the FIG 4 graph. Assume now the extraordinary beam 60 to be polarized perpendicular to vector E in FIG. 2, at an azimuth of 45° from the strain axis X of the plate 10, so that beam 60 may be resolved into two equal vector components, one parallel and one perpendicular to the induced strain axis.

While a great variety of relative orientations of elements 64 and 66, in conjunction with the polarities of electrical circuitry adapted to receive signals from phototube 67, will produce equivalent results, for the purposed of the analysis to follow hereunder certain simplifying assumptions are made: (a) The retardation introduced by the modulator is positive when the fast axis of the modulator is parallel to the fast axis of the fixed retarder. (b) The extraordinary beam 60 is polarized perpendicular to the transmission axis of the analyzer 66.)

Case I

When the modulator plate is undergoing zero strain, there is no differential phase delay between the two vector components of the beam. Beam 60 passes through the modulator at 61 and 63 still linearly polarized, is incident on retarder 64 polarized at an azimuth of 45° with the fixed fast axis of the retarder, and exits from the retarder 64 at 65 as a circularly polarized beam, containing one-half of the total flux (the other one-half of the flux was lost to the ordinary ray 31). In passing through the analyzer, the beam becomes plane polarized, halving the flux content or intensity of beam 65, so that only one-quarter of the total flux arrives at the photomultiplier 67. Analyzer 66 may be of the Rochon or Senarmont type; in such a system, for the ideal case under consideration, half of the energy at 65 impinging upon analyzer 66 is lost as an extraordinary beam 80 to the mask or light trap 81. This establishes point A on the FIG. 4 graph.

Case II

When the modulator is undergoing strain to instantaneously produce a 45° phase displacement between the two vector components of the linearly polarized extraordinary ray 60, these two components after two passes through the modulator have thus undergone 90° relative phase retardation, and the beam is circularly polarized. The fixed retarder 64 converts this beam to a linearly polarized beam at 65, having its vector in alignment with the transmission axis of the analyzer 66. As a result, there is no loss of flux in the analyzer, and the intensity of light falling on the photomultiplier is 0.5, represented at point B on the graph.

Case III

When the modulator is undergoing strain to instantaneously produce 90° phase displacement between the two vector components in beam 60, after two passes through the modulator 180° of phase delay have been produced and the beam falling on the retarder 64 is plane polarized with its vector rotated 90° relative to its position before passage of the beam through the modulator. The beam at 65 is circularly polarized, and of opposite sense relative to that of case I, so that as in case I, one-half of the flux is eliminated in the analyzer, leaving beam 103a with only one-fourth of initial flux content. This establishes point C in the graph.

Complete analysis shows that flux intensity I of beam 103a is a continuous sinusoidal function of twice the differential phase delay $20_D$, applying to negative differential phase delay as well as positive. This function is:

$$I_{103a} = ¼(1 + \sin 2 0_D)$$

FIG. 4 also suggests that as phase delay is cyclically generated, the intensity of light falling on the photomultiplier changes cyclically. Analysis of the intensity waveform shows that the intensity variations contain the fundamental frequency of the phase delay fluctuations of the modulator, multiplied by the Bessel function $J_1 (2 0_{D-max})$, so that if the amplitude $0_{D-max}$ of the fluctuating phase delay $0_D$ reaches about 110°, the fundamental component of the light intensity fluctuation is reduced to zero. With further increase beyond 110° of peak optical phase delay fluctuation, the fundamental in intensity fluctuation reappears, with reversed sign (in other words, 180° change of time phase), providing a null in the fundamental component of intensity at about 110° peak phase delay.

The reverse in sign of the fundamental component of intensity fluctuation, in passing through the null, results in negative feedback around the loop comprising phototube 67, amplifier 21, drivers 13b, plate 10, retarder 64, and analyzer 66. This change in sign or time phase of the fundamental component of intensity fluctuation of the light beam 103a is manifested in a corresponding change in sign, or phase, of the electrical signals at 70 and 23. The result is a stable equilibrium vibration amplitude of plate 10, such as to produce peak relative optical phase delay of approximately 110°.

While the retarder 64 has been chosen as a quarter-wave device because this retardation maximizes the fundamental component of the signal at the phototube, and this maximizes the sensitivity of the automatic control mechanism, retarder 64 can also be chosen to have any other retardation whose sine is not zero, and the device will operate, but not with maximum sensitivity.

Retarder 64 need not be a device whose retardance as measured in wavelengths is constant for light of different wavelengths. In view of the preceding statements regarding maximization of sensitivity, variation with wavelength of the retardance of the fixed retarder results only in a variation with wavelength of the sensitivity of the automatic control mechanism. The retarder 64 may be chosen to be a quarter-wave device at some wavelength roughly central to the wavelength range over which the instrument is to operate.

Analyzer 66 has been described as of the Rochon or Senarmont type; alternatively, a pile-of-plates or Polaroid sheet analyzer may be used. Such a substitution would result in modification of the three-case analysis presented above, as regards the magnitude of the light flux reaching phototubes 67, in a manner understandable to those skilled in the art.

Referring back to FIG. 3, the output 70 of the photomultiplier 67 drives the oscillator amplifier 21. Upon starting of the system, the oscillations of plate 10 increase in magnitude. The light flux in beam 103a results in photomultiplier output at 70 controlling the oscillator amplifier 21 driving the plate 10. When the optical phase delay of the modulator approaches the critical value of 110°, the fundamental component of the light intensity fluctuation is diminished and approaches zero, whereby the output of the oscillator amplifier 22 diminishes. This in turn acts to restore the fundamental component and to control the amplifier 21 in such manner that the system reaches an equilibrium condition proximate an optical phase delay of about 110°.

It is found that for maintenance of optimum elliptical polarizations of beam 33, for the particular circular dichroism measurement system described in the above-referenced copending application of Hooper et al., the amplitude of phase delay introduced by the plate 10 should be approximately 113°. Thus, the system operates in a steady state under conditions favoring highly precise measurement of circular dichroism in samples. Similar arrangements of fixed retarders and analyzers may be employed to produce similar steady-state cyclical variation of birefringence in modulators, but with other amplitudes closely approximating ideal modulation amplitudes for other types of measurement systems, as will be apparent to those skilled in the art.

I claim:

1. In apparatus for modulating the ellipticity of polarization of a beam of light, including a modulator operable upon an incident linearly polarized beam of radiation to produce at least one emergent beam having ellipticity cyclically varying at a frequency, said beam characterized by sequentially different wavelengths of radiation, and including first means, operable upon one such emergent beam, for deriving a modified beam whose intensity varies cyclically as a function of such cyclically varying ellipticity the improvement comprising:

second means, responsive to a component of said cyclically varying intensity, for controlling said modulator to maintain the amplitude of the cyclical variation of said ellipticity at a predetermined level at each of said sequentially different wavelengths;

said component being characterized by oscillation at said frequency, the amplitude of said oscillation approaching a null at said predetermined level, and said second means including a photodetector responsive only to said modified beam, the photodetector having an output, an amplifier having an input directly connected to the photodetector output, the amplifier having an output, and a transducer having an input directly connected to the amplifier output to drive the modulator.

2. The improvement of claim 1 wherein:

said first means comprises a fixed retarder and a polarizing element receiving said one emergent beam.

3. The control system of claim 2 including instrumentation for the measurement of circular dichroism connected with said apparatus to receive polarized light emerging from said retarder.

4. The improvement of claim 2 wherein the frequency of the photodetector output is the same as the frequency of the amplifier output applied to the modulator.

* * * * *